(12) United States Patent
Houdek (10) Patent No.: US 8,347,547 B1
(45) Date of Patent: Jan. 8, 2013

(54) STOWABLE FISHING DEVICE

(76) Inventor: Dean J. Houdek, Spillville, IA (US)

( * ) Notice: Subject to any disclaimer, the term of this patent is extended or adjusted under 35 U.S.C. 154(b) by 93 days.

(21) Appl. No.: 12/928,660

(22) Filed: Dec. 16, 2010

(51) Int. Cl.
*A01K 85/00* (2006.01)
*A01K 85/10* (2006.01)

(52) U.S. Cl. ............... 43/42.13; 43/42.02; 43/42.11; 43/42.15

(58) Field of Classification Search ............ 43/42.02, 43/42.04, 42.08, 42.11, 42.13, 42.14, 42.15, 43/42.16, 42.17, 42.19, 42.23, 42.24, 42.29, 43/42.3, 42.41, 42.47, 42.51, 42.52; *A01K 85/00, A01K 85/10*
See application file for complete search history.

(56) References Cited

U.S. PATENT DOCUMENTS

| | | | |
|---|---|---|---|
| 2,683,324 A * | 7/1954 | Engelman | 43/42.74 |
| 3,744,178 A * | 7/1973 | Denny | 43/42.74 |
| 4,133,135 A | 1/1979 | Miles | |
| 5,605,004 A | 2/1997 | Boullt et al. | |
| 6,701,662 B1 | 3/2004 | Moore | |
| 6,880,287 B2 | 4/2005 | Eubanks | |
| 7,197,846 B1 | 4/2007 | Gibson | |
| 2003/0074828 A1 | 4/2003 | Sprouse | |
| 2003/0233782 A1 * | 12/2003 | Routsaw | 43/42.13 |
| 2008/0263935 A1 | 10/2008 | Albrecht et al. | |
| 2010/0175303 A1 * | 7/2010 | Caison | 43/4.5 |

* cited by examiner

*Primary Examiner* — Darren W Ark
*Assistant Examiner* — Timothy Schwarz
(74) *Attorney, Agent, or Firm* — M. Paul Hendrickson (57) ABSTRACT

The invention provides a fishing device adapted to carry a plurality of fishing lures. The fishing device includes a winged section having a support shaft guide which slideably engages onto a wire support shaft equipped with a winged section retaining eyelet. Depending upon the slideable position of the support guide in relation to the winged section retaining eyelet, the winged section may be retained and collapsed about the wire support shaft in a stowable form or allowed to radially expand to a fishing lure position. The winged section and the support shaft are adapted to carry a plurality of fishing lures dimensionally triangulated along different planes of carriage travel.

19 Claims, 4 Drawing Sheets

STOWABLE FISHING DEVICE

FIELD OF INVENTION

The present invention relates to a fishing device equipped to carry fishing lures and more particularly a fishing device adapted to carry a plurality of fishing lures.

BACKGROUND OF THE INVENTION

There exists a desire amongst anglers to attach more than one lure to a single fishing line so as to create a more alluring lure. The most common approach constitutes bending a wire to an acute angle and equipping the bent wire with multiple eyelets or other suitable hook-up means for attaching multiple lures to a single bent wire and a the fishing line.

U.S. Pat. No. 4,133,135 to Miles discloses a fishing lure comprising a spinner bait having two spinning blades associated with a fishhook in which each of the blades are independently aligned and supported by a stationary wire attached to a hooked lure. Each of the Miles blades are supported by two wires extending alongside each other with one wire being longer than the other with both wires including a laterally offset portion having a swivel and spinning blade attached to the outer end. In U.S. Pat. No. 7,197,846 to Gibson there is disclosed a fishing lure used to hold artificial bait in a topside manner that prevents the artificial bait from flipping over in the water at various speeds while allowing the artificial bait to have a wobbling motion to attract fish. The fishing lure has a spoon-shaped body with a hook extending from the rear of the body. A shank assembly is disposed through the body. The Gibson lure also accommodates a spoon-shaped body having a hook extending from the rear of the body. The shank assembly is disposed through the body with spinning blades attached to the upper and lower ends of the shank assembly. The fishing lure permits a hook to be attached to a spoon-shaped body in a manner which consistently points the hook upwardly and forwardly with respect to the spoon shaped body.

United States Patent Publication No. U.S. 2003/007428A1 to Sprouse discloses a spinner bait having two legs or arms with spinners anchored onto a weighted lure with a trailing fishing hook. Also, U.S. Patent application publication No. U.S. 2003/0233782A to Routsaw discloses a bent wire equipped at one end with a hooked lure and plurality of other fixed wires for carrying spinner baits.

Although there exists numerous suggestions for making fishing lures equipped to attach or carry multiple fishing lures including spinner blades, the patent literature is primarily concerned with various fixed configurations which generally rely upon fixed or stationary wire system for mounting multiple lures to a single fishing device. Unfortunately, little, if any, concern has been devoted to the bulkiness and overall incompatibility of these multiple lure devices for use within the field. Because these bulky and unyielding multiple lure devices may be easily entangled with other fishing equipment, often requiring tedious effort and time to untangle, such bulky fishing equipment generally necessitates separate storage from the other fishing equipment. This creates a cumbersome problem since most other lures can be easily stored in a conventional tackle box.

There exists a need for a fishing lure device which will accommodate a plurality of fishing lures while also permitting the fishing lure device to compactly collapse about itself into a compact and stowable lure which may be easily stowed within conventional tackle boxes. The present invention provides a fishing lure device which accommodates multiple, radially positioned lures for fishing, and when not in use, will conveniently collapse about a support wire to provide a compact and stowable lure. There also exists a need for a uniquely different lure which relies upon a cooperative interaction between uniquely different lure component parts to yield a fishing device that supports a plurality of lures and exhibits a unique fishing efficacy and lure movement.

SUMMARY OF THE INVENTION

The stowable fishing device of this invention is adapted to carry a plurality of fishing lures so as to provide a plurality of off-set fishing lure positions. The fishing device includes a winged section which slideably engages onto a support wire having eyelet retaining member. The winged section includes a support wire guide such as a yoked guide which slideably engages onto the support wire. The yoked guide supports a pair of radially outwardly extending legs or arms which when unrestrained by the eyelet retaining member will radially expand outwardly to a fishing lure position. However, when the yoke guide is slideably positioned along the support wire at a sufficient distance removed from the eyelet retaining member, the arms will collapse within the eyelet and along the support wire to provide a stowable fishing device.

The fishing device of this invention when equipped with multiple lures affords a unique fishing action which enhances fish attraction and catches. The fishing device uniquely allows the fishing device to expand into a multi-planar or dimensional fishing device having a plurality of arms or legs for attaching lures thereto. The fishing device also collapses into a compact stowable fishing device suitable for storage in a conventional fishing tackle box.

The stowable fishing device in its most basic form provides the basic structure for attaching to a single fishing line, along with any desired plurality of fishing lures to the fishing device. If desired, the basic structure may be fully equipped with the desired fishing lures or equipped so as to allow the fisher to attach any desired set of lures to the fishing device.

DETAILED DESCRIPTION OF THE INVENTION

With reference to the Figures, the present invention provides a stowable fishing device 1, the basic structure of which comprises a main wire support 3 and a winged section 5 slideably engaged and retained onto the main wire support 3. The winged section 5 includes lure attaching members or mounts (generally prefixed by 13) for attaching lures (generally prefixed as L). The winged section 5 comprises a wire retaining support guide 9 which slideably engages onto the main wire support 3 and a pair of arms 11A & 11B adapted for attachment thereto of the desired fishing lures L onto the lure attaching members (generally prefixed by 13).

Figure 1:
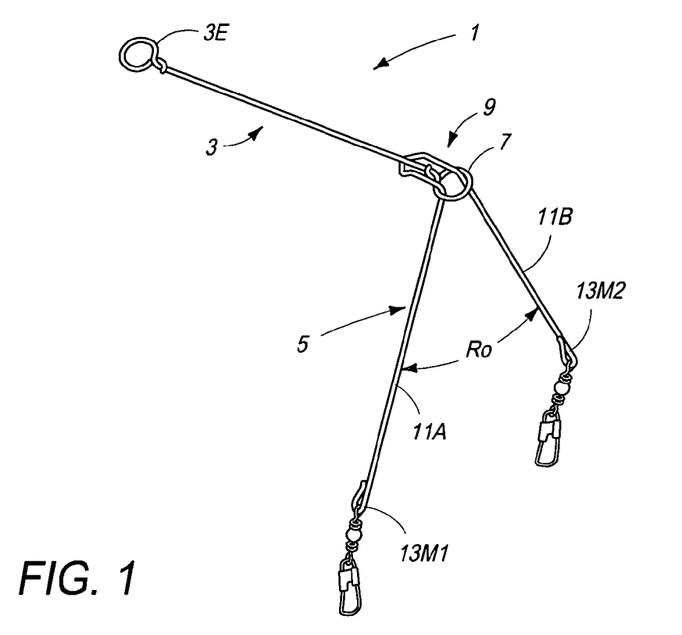
FIG. 1 depicts an perspective frontal side view of the fishing device of this invention in an expanded position without any fishing lure attachment.

The fishing device 1 depicted by FIG. 1 provides the angler with a unique opportunity of having a fishing device 1 capable of carrying a host of lures positioned at a variety of different fishing planes which in its expanded form is too bulky and unsuited for proper storage in a tackle box but yet collapses into a compact and stowable form.

The stowable fishing device 1 of FIG. 1 equipped with multiple lure mounts 13 and lures L such as depicted in FIGS. 2-5 comprises:
  a) a main support wire 3 adapted to carry a main support wire fishing lure L1 at one wire end and a wire retaining member 7 oppositely positioned therefrom; and
  b) a winged wire section 5 having a main support wire guide 9 slideably engaging onto the main support wire 3.

Figure 2:
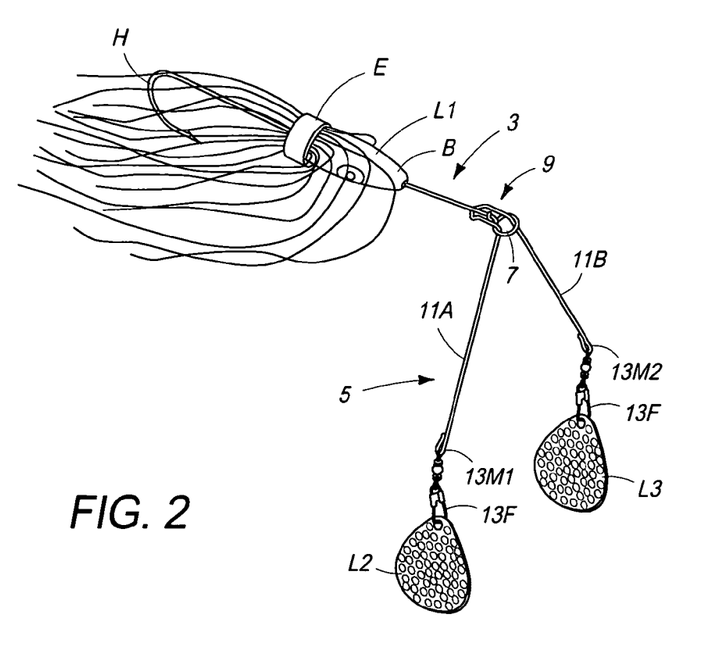
FIG. 2 is a view of the fishing device shown in FIG. 1 equipped with multiple fishing lure attachments.
Figure 5:
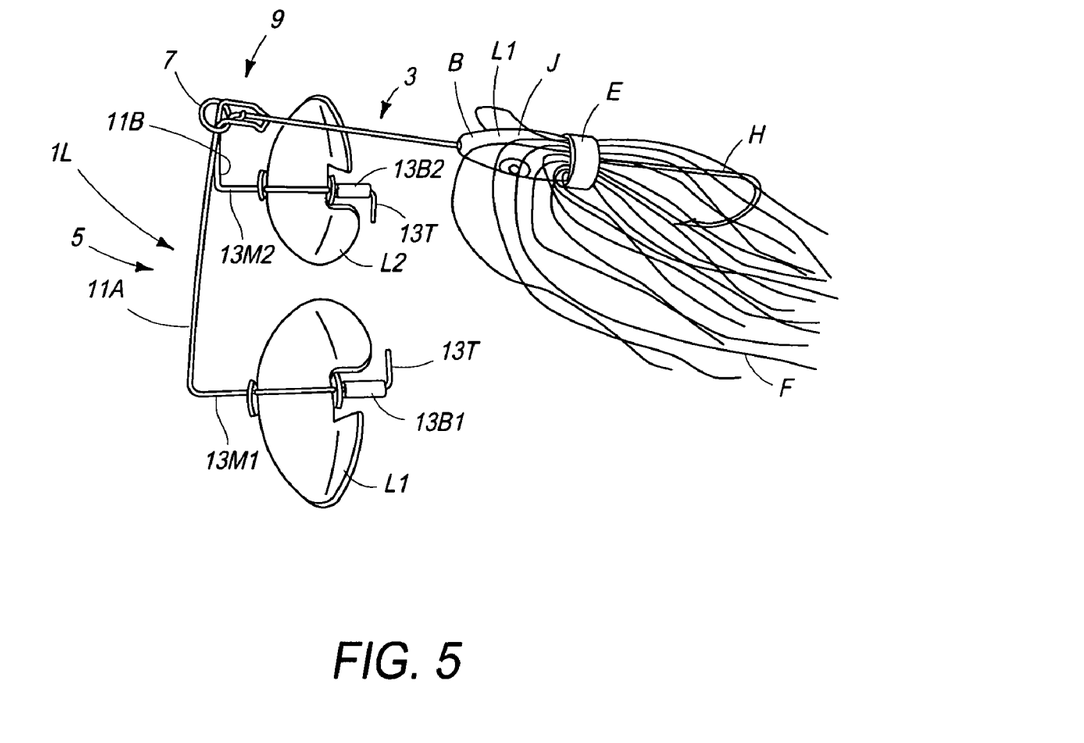
FIG. 5 is an perspective side view of the fishing device of FIG. 1 depicting other suitable alternatives for securing multiple fishing lures to the fishing device.

The winged wire section 5 includes a pair of radial arms 11A & 11B which when not fully restrained by the wire retaining member 7 will radially extend outwardly therefrom in a fishing lure position. Any suitable means for attaching multiple lures (e.g. such as L2 & L3) to the arms 11A & 11B may be utilized as depicted in FIGS. 1-2 and 5. The radial extending arms 11A & 11B may accordingly be respectively equipped with mounting eyelets 13M1 & 13M2 for mounting lures thereto. Fixed lure mounts (13M1 & 13M2) for securing lures L1 & L2 to arms 11A & 11B are depicted in FIG. 5.

Figure 3:
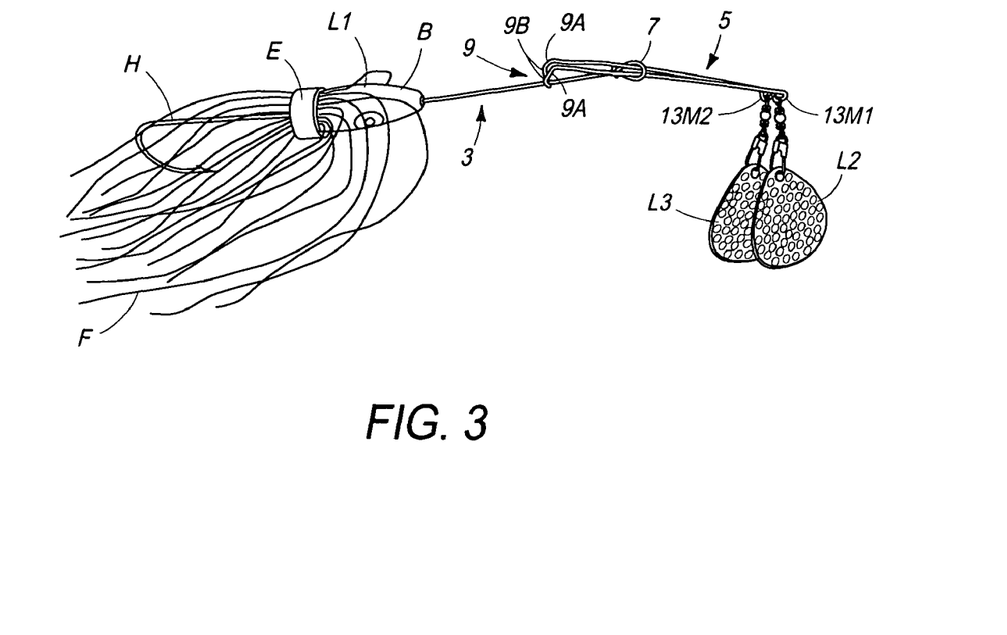
FIG. 3 is a side view of the fishing device equipped with the multiple fishing lure attachments of FIG. 2 in the process of being withdrawn to a collapsible and stowable position.
Figure 4:
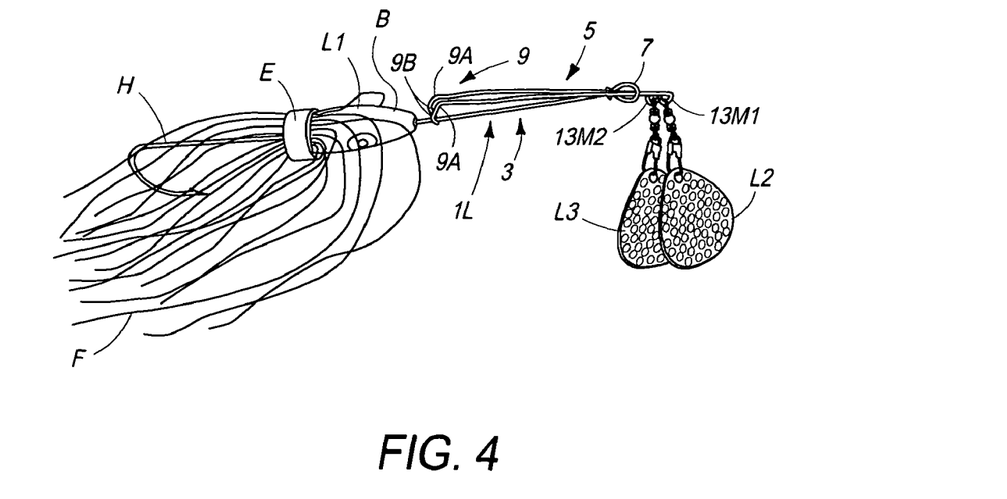
FIG. 4 is a view of FIG. 3 depicting the fishing device with the attached lures withdrawn to a stowable position.

The winged section 5 may be constructed of a single springed steel wire piece bent appropriately to provide a wire retaining guide 9 for guiding arms 11A & 11B along the main support wire 3 so as to allow arms 11A & 11B to expand to a radially outwardly extending position as depicted in FIGS. 1-2 and 5-8 or to the collapse or partially collapse for convenient stowing as comparatively illustrated by FIGS. 3 and 4. The arms 11A & 11B are slideably retained within the wire retaining member 7 so as to permit the arms 11A & 11B to extend to a radially outwardly extending position when the main wire support guide 9 is slideably drawn onto the wire retaining member 7 so as to release arms 11A & 11B from retention by the wire retaining member 7 as illustrated by FIGS. 1-2 and 5-8 and conversely to retain the arms 11A & 11B along the main support wire 3 by slideably drawing the support guide 9 away from the wire retaining member 7 so as to longitudinally collapse the arms 11A & 11B within the wire retaining member 7 and along the main support wire 3 and thereby provide a compact and stowable fishing device 1 as depicted by FIG. 4.

The forward portion of the main wire support 3 may be appropriately provided a wire retaining member 7 for housing and slideably retaining therewithin arms 11A & 11B. This wire retaining member 7 in addition to housing arms 11A & 11B also serves as a site for connecting the fishing line to the fishing device 1. As may be comparatively observed by FIGS. 1-8, the slideable positioning of the wire support retaining guide 9 upon support wire 3 will determine whether arms 11A & 11B are unrestrained from radial extension by the wire retaining member 7 so as to permit a radially outwardly extending position as depicted by FIGS. 1-2 and 5-8 or collapsed about the support wire 3 by the wire retaining member 7 comparatively as illustrated by FIGS. 3 and 4. As illustrated by FIGS. 3 and 4, it may be further observed that as the wire retaining guide 9 is drawn backwardly along the support wire 3, the winged wire retaining member 7 serves to forcibly and biasingly collect the springed arms 11A & 11B therewithin and causes arms 11A & 11B to collapse generally along a longitudinal plane aligning onto the main wire support 3. Conversely, when the guide 9 is drawn forwardly sufficiently to overcome the gathering or restraining effect of the wire retaining member 7, the unrestrained arms 11A & 11B will spring outwardly to their unrestrained outwardly radially extending fishing lure position (e.g. refer to FIGS. 1, 2 and 5-8). Pragmatically, the available length of the wire support shaft 3 should be sufficient in length in order to permit the withdrawn arms 11A & 11B to collapse and align along the main support shaft 3 such as illustrated by FIG. 4 which depicts the arms 11A & 11B almost fully withdrawn along support shaft 3 so as to provide a stowable fishing device 1.

The configuration of the wire retaining guide 9 in cooperation with its slideable relationship to the support wire 3 can be effectively utilized to enhance the over-all performance efficacy in the collapsing of arms 11A & 11B within the wire retaining member 7 and conversely, to achieve the spontaneous extension of arms 11A & 11B to the desired radially outwardly positioning. As may be further observed from the Figures and particularly the magnified views of FIGS. 6-8, the support wire retaining guide 9 may be appropriately provided in the form of a yoked wire guide 9 which in the extended position positions the arms 11A & 11B of the winged section 5 at an right angle relationship to support wire 3. The yoked guide 9 angularly extends outwardly a sufficient distance so as to allow arms 11A & 11B in juxtaposition to the yoked guide 9 to radially expand outwardly and seat against the inner rim of the arm retaining eyelet 7, typically in the rim center. As may be observed from FIGS. 1-2 and 5-8, the arm retaining eyelet 7 of the fishing device 1 serves to brace the outwardly extending arms 11A & 11B for the appropriate fishing positioning by biasingly bracing the yoked guide 9 at its yoked end against the support wire 3 while the downwardly and radially outwardly extending arms 11A & 11B create an outwardly biasing force against the wire retaining eyelet 7 which cooperative combination collectively serves to stabilize and limit the outwardly positioning of arms 11A & 11B for fishing. By centering the bend between the arms 11A & 11B and yoke 9 within eyelet 7, arms 11A & 11B may be radially bent outwardly, forwardly, or rearwardly without adversely effecting the ability of the eyelet 7 to collapse and align arms 11A & 11B along support wire as yoke 9 is drawn away from eyelet 7.

Figure 6:
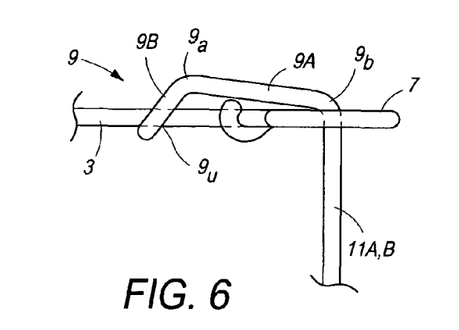
FIG. 6 is a partial and magnified side view depicting the fishing device shown in FIG. 2.
Figure 7:
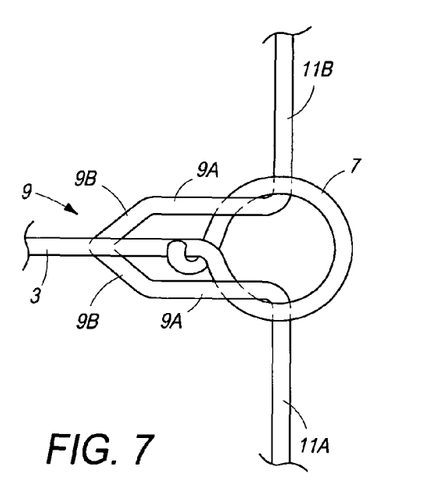
FIG. 7 depicts a top view of FIG. 6.
Figure 8:
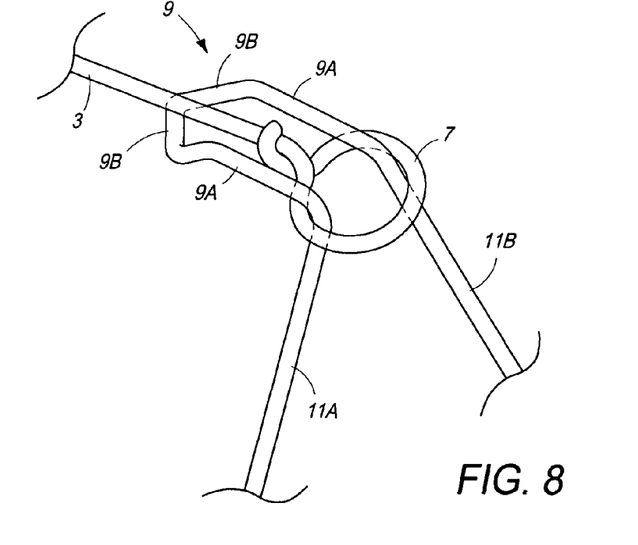
FIG. 8 depicts an perspective side and frontal view of FIG. 6.

It will be further observed with reference to the Figures and particularly FIGS. 6-8, that the depicted yoked guide 9 depicts a second bent section 9A which rests at about a 90 degree or right angle bent relationship to arms 11A & 11B and a first bent section 9B towards the tip of yoke guide 9 which may be made by bending the first section 9B at about a 135 degree angular relationship to the second bent section 9A. The first bent section 9B also includes a u-shaped groove or trough 9u which serves to guide the winged section 5 as it slideably engages onto the support shaft 3. These particular bends in the yoked guide 9 may be precisely configured so as to position the radially extending arms 11A & 11B in a substantially perpendicular relationship to the aqueous fishing path of travel of the main support wire 3 as may be observed from FIGS. 5-8. If desired, the forwardly or rearwardly positioning of the extended arms 11A & 11B may be appropriately changed to any desired positioning by changing the angular degree of bends of the arms 11A & 11B at their juncture onto the yoked guide 9. The cooperative interrelationship between the yoked support shaft guide 9, the arm retaining eyelet 7, the arms 11A & 11B and the wire support shaft 3 is typified by the magnified views of FIG. 6-8. It will be observed that when the yoked guide 9 is positioned to allow arms 11A & 11B to radially expand downward to the fishing position, the angular bends of the yoked guide 9 and the respective bend lengths of 9A & 9B are especially adapted to place arms 11A & 11B in direct alignment at the bisecting center of the arms retaining eyelet 7. Thus, it will be observed, the inner edge of the vortex 9u of the yoked support guide 9 rests flushly against wire support shaft 3 while arms 11A & 11B are centrally plumbed within the arms retaining eyelet 7.

Depending upon the fishing conditions, the size and strength of the fishing device 1 may be changed to whatever lure size and desired strength. If longer arms 11A & 11B are desired, then the length of the winged section 5 as well as the wire support shaft 3 length may be lengthened to accommodate the longer radial arms 11A & 11B. Similarly, the strength of the arms 11A & 11B and the fishing device 1 may varied by the utilization of a springed wire of an appropriate gauge and strength so as to accommodate the desired degree of strength for the desired fishing conditions. The overall strength of the device 1 as well as the weighted lures L used in combination with the fishing device 1 may be accordingly adjusted to accommodate the particular desired type of fishing conditions of its use. The diameter of the wire, the wire stiffness and metallic composition of the wire are all factors entering into the suitably of certain types of wire for the wire support shaft 3 and the winged section 5. In general, the titanium alloy wires are particularly well suited in fabricating the winged section 5 whereas the stainless steel and titanium wires may be applied to the wire support shaft 3. Springed single strand steel wires without the addition of rust and corrosion inhibiting alloys are not as well suited as the stainless steel and titanium alloyed wires.

The fishing device 1 herein is adapted to accommodate a wide array of fishing lures (generally prefixed by L) by equipping the device 1 with appropriate lure fastening member or mounts (generally prefixed by 13) to accommodate easily removable lures L as depicted by FIGS. 1-4 or by directly incorporating a plurality of lures L into a collapsible and stowable fishing device 1 as depicted by FIG. 5. The main wire support 3 at a wire end opposite from the arm retaining eyelet 7 may be fitted with a lure engaging eyelet 3E so as to permit an angler to attach whatever type of lure L that may be desired thereto or alternatively (as depicted by FIGS. 2-5) by incorporating a weighted hook lure L1 directly onto the wire support shaft 3 using (if desired) support wire eyelet 3E to facilitate the anchoring of lure L1 to support wire 3. If desired, the forwardly positioned arm retaining eyelet 7 and extendable radially arms 11A & 11B may alternatively be oppositely positioned upon the main wire shaft support 3 with the desired anchored or attachable fishing lure L thereto such as a hook H equipped with a fishing line lure eyelet for securing it to a fishing line.

As depicted by FIG. 1, the fishing device 1 in its basic or elemental structure consists essentially of a main support shaft 3 equipped at one end with the winged wire retaining member 7 and a winged wire section 5 slideably engaging onto the main shaft 3 guided thereupon by a wire engaging guide 9, with arms 11A & 11B of the winged section 5 being positioned in a fishing position or withdrawn to a stowable position. The wire retaining member 7 serves to control the radial positioning of arms 11A & 11B by providing either an open fishing position or a closed stowable position, all of which depends upon the slideable positioning of guide 9 upon the main shaft 3. The movement or slideable positioning of the wire retaining guide 9 (e.g. such as yoked guide 9) in relationship to the winged section retaining member 7 determines whether or not arms 11A & 11B are collapsed or retained along main shaft 3 as illustrated by FIGS. 3 and 4 or released onto at an outwardly radially fishing position as depicted by FIGS. 1-2 and 5-8.

Utilizing the basic structure of the fishing device 1, a host of different types of multiple lures L mounted thereto may be provided by this invention as typified by FIGS. 2-5. Multiple positioned fishing lures ranging from floating lures L (e.g. floating bass lures) to lures L designed for use in swift currents or deep water fishing may be incorporated into the basic structure of the fishing device 1. The fishing device 1 provides a highly effective carriage for multiple lures. For the lighter uses, smaller gauge wires and lighter weighted lures may be used to fabricate the fishing device 1 and the lures adapted for use therewith. Conversely, for heavier uses, heavier gauge springed wires and heavier weighted lures may be used. The depicted aft lure mounting eyelet 3E of the fishing device 1 as depicted by FIG. 1 provides a suitable means for securing or anchoring a lure L1 such as hooked jig as depicted by FIGS. 2-5 but may be eliminated if desired by other appropriate means of securing a support wire lure L1 thereto.

FIGS. 2-5 depict the adaptation of the fishing device 1 to multiple spinner bait type lures L, an application for which the fishing device 1 herein is especially well adapted. As may be observed from FIGS. 1-4, arms 11A & 11B may each be appropriately fitted with lure eyelets 13M1 & 13M2 for lures L2 & L3 with or without swivel snap fasteners 13F fastened thereto so as to permit the angler to directly attach and freely interchange whatever lures L2 & L3 may be desired. In contrast, FIG. 5 depicts the fixed mounting of a pair of propeller spinner blades L2 & L3 directly to fabricated lure mounts 13M1 & 13M2 by bending arms 11A & 11B at right angles to provide the shaft mounts 13M1 & 13M2 for mounting the propellers spinner blades L2 & L3 or other desired lures along with the corresponding spinner blade bearings 13B1 & 13B2. The lures L2 & L3 and spinner blade bearings 13B1 & 13B2 are secured onto the mounting shafts 13M1 & 13M2 by a right angular locking bent section 13T at the terminating ends of mounts 13M1 & 13M2. To change lures L2 & L3, the locking bent section 13T would need to be straightened to permit the removal and reinsertion of new lures L.

Commercial single strand steel wire stocks for use in making fishing lures are available in wire diameters ranging from 0.012 inch to 0.062 inch in precut lengths (e.g. 3", 4", 6", 8" and 12" lengths) or in bulk. Single strand wires of stainless steel and titanium alloy wire precut or in bulk of corresponding diameters are commercially available for use in making the present fishing device 1. These single stranded wires are also commercially available in the form of closed looped wire shafts (i.e. loop one end and straight cut opposite end, open loop wire shafts straight cut at opposite end) which may be combined with beads to close the open loop or straight wire shafts to which a wire retaining eyelet may be appropriately fabricated. The wire support shafts 3 and winged sections 5 herein may accordingly be fabricated from bulk reels of single strand steel wire using the desired wire diameter cut to the appropriate lengths and formed with conventional lure bending and fabricating equipment into the main shaft 3 and winged section 5 herein. Further, illustrative information as to steel wire shafts and suitable wires therefore may be obtained by reference to www.luremaking.com/catalogue/catalogue-index/catalogue-items/wireshafts. Although FIGS. 1-4 depict a closed loop lure attaching eyelets 13, other lure fasteners such as an open loop or hook snap fastener may also be utilized for this purpose. Although the support shaft 3 may be constructed of a variety of support materials, its construction is particularly adapted to those metallic wires possessing sufficient rigidity to slideably support the winged section 5. The winged section 5 necessitates the use of construction materials which possess sufficient spring and internal memory characteristics so as to perform within the fishing device 1 herein the collapsing of arms 11A & 11B about the support shaft 3 when retained by the arm retaining member 7 coupled with the capacity to radially expand and support lures L2 & L3 when substantially unrestricted thereby. Springed steel wires and particularly the corrosion resistant stainless steel and titanium alloyed wires may be particularly adapted for use for this purpose.

The main support shaft 3 may be constructed of any suitable rigid matter which provides a shaft 3 for slideably mounting thereto the winged section 5. The support shaft 3 also serves to anchor the winged section retaining member 7 at one support shaft end and typically a hooked lure L1 at an opposite aft shaft end. The main shaft 3 and the winged section 5 may be appropriately constructed of a single strand springed steel wire and particularly of a stainless steel or titanium wire with the latter particularly being applicable to the winged section 5. Such single strand stainless steel and titanium wires will generally possess sufficient strength, as well as the required spring or memory characteristics to permit the winged section to collapse along the main shaft 3 while also allowing arms 11A & 11B to repetitively and radially expand to a fishing position when the wing section yoke 9 is drawn sufficiently towards the wire retaining eyelet 7 to allow arms 11A & 11B to radially spring outwardly therefrom.

The most appropriate wire diameter or wire gauge for making the fishing device 1 and fishing device equipped with multiple lures (generally prefixed by L) herein will depend upon the intended use of the fishing device 1. A stronger and heavier diameter or gauge wire (e.g. 0.050" or higher), as well as a longer main shaft 3 and winged sections 5 may be used to fabricate the more sturdier fishing devices 1 for use with the larger fresh water fish applications (e.g. northern pike and muskies) and the salt water fish. For the less aggressive and smaller sized fish (e.g. blue gills, perch, etc.), the smaller diameter wire and shorter shaft 3 and winged sections 5 may be used to make the fishing device 1.

As previously indicated, the fishing device 1 herein is especially suitable in providing a multiple lure based fishing device 1L and especially with regard to those equipped with what is commonly referred to as spinner baits such as depicted herein by FIGS. 2-5. As well recognized by the trade, there exists a wide variety of spinner blades which may be used to revolve on a wire shaft as may be observed by FIG. 5 or connected by a snap swivel as depicted by FIGS. 1-4. Spinner blades are available in various shapes, sizes, and finishes and may also include other accessories or parts such as swivels, beads, clevis, split rings, body forms, etc., for attaching the blades. The spinner blades are typically used in sizes ranging from No. 00 to No. 7 and up with the smaller sizes being suitable for smaller fish such as trout and pan fish while the larger sizes are better suited for larger fish such as bass, muskie, pike, lake trout, and salt water fish. Illustrative of commonly available spinners (but not all inclusive) include the Indiana, Colorado, willow leaf, june bug, kidney, propeller spinners and a host of other spinner types equipped with a host of different types of textured surfaces (e.g. such as hammered, etc.) and finishes.

The multiple lure carrying device 1L of this invention as illustrated in FIGS. 2-5 depicts a hooked jig lure L1, carried by the mains support shaft 3 and spinner blades lures L2 & L3 carried by arms 11A & 11B. Depending upon fishing conditions, the multiple lure device 1L herein will typically require additional weight in order to adequately perform in its intended manner. Fast currents and deep water fishing typically requires more weight than is required for surface or floating lure fishing in calm waters. As commonly known, weights in the form of in-line sinkers or as jig heads ranging typically in weight from $\frac{1}{32}$ of an ounce to one ounce weight (in $\frac{1}{16}$ and $\frac{1}{8}$ ounce increments) or more may be utilized to weight the multiple spinner bait lure 1L herein. The required weight may be derived from weighted sinkers, leaded jig heads and other weighted sources commercially obtained or fabricated by jig makers using conventional jig molds, lead or other weighted materials to fabricate the jig L1. If desired, the jig head J equipped with the trailing hook shank F and hook H may be directly molded onto the aft end of a straight wire cut of the main support shaft 3. The aft support wire aft eyelet 3E (which is not essential) as depicted in FIG. 1 may be effectively used to more securely anchor or mold the jig lure L1 to the support shaft 3. FIG. 1 depicts for illustrative purposes a single loop or eyelet 3E on the aft support shaft 3 end at an opposite end from the wire retaining eyelet 7. The single looped eyelet 3E may appropriately provide a site for anchoring the hook eyelet (occluded from view) of the jig hook H along with the support shaft eyelet 3E by riveting these two eyelets directly onto the jig body B. Other means for securing the wire support shaft 3 to the hooked jig L1 such as molding the jig body B and attached jig hook H within a jig mold to firmly anchor the hook H to the jig body B may be applied. Commercially available jigs fully equipped with the jig body B, elastic bands E for securing skirts F (typically of filamentous strands) to the jig body B, hooks H in which the jig bodies B are equipped with jig forward and aft positioned shaft receiving bores (not shown) to accommodate the support shaft 3 and eyelet 3E and jig hook H eyelet may be used to incorporate and anchor the jig lure onto the support shaft 3. Alternatively, a jig mold with the molten metal may be directly molded onto the shaft aft end 3E or glued or otherwise secured or anchored to the shaft 3 to fabricate the multiple bait lure 1L herein. Accordingly, the hooked jig lure L1 may be directly molded onto the support shaft 3 or supplied separately for attachment thereto.

Although the multiple lure carrying device 1 of this invention has been depicted as a dual laterally disposed spinner blades L2 & L3 equipped with a main shaft jig lure 1L, the fishing device 1 my be effectively adapted to carry a host of other types of lures upon its radially extending arm 11A & 11B and its main shaft 3.

In addition to providing a uniquely storable fishing device 1, the positioning of the radially extending arm 11A & 11B in cooperative association of the winged section 5 nestling against the wire support main shaft 3 via the yoked guide 9 provides a uniquely different type of performing lure. The retention and limiting of the radially outwardly extension movement of arm 11A & 11B by the winged section retaining eyelet 7 permits a radially inward movement when retrieved in water such as by a reeling but its outward movement remains limited by the retaining eyelet 7, all of which creates a lure exhibiting an exceptionally uniquely different efficacy in attracting fish. As may be observed from FIGS. 1-2 and 5-8, the winged section or arm retaining eyelet 7 in combination with the anchoring of the winged section yoked guide 9 to the main wire support shaft 3 limits the outermost or outwardly radially extension of arm 11A & 11B while still allowing for example the spinner blades L2 & L3 to be drawn inwardly under the water pressure generated as the lure 1L is propelled or reeled through the water. As may be imaginarily visualized, a sporadic reeling retrieval of the multiple spinner bladed lures L2 & L3 will tend to draw the arms 11A & 11B inwardly while a retrieval pause will allow the radial arm 11A & 11B to extend outwardly onto the winged section retaining eyelet 7 which serves as a stop, all of which provides the angler with a lure capable of providing unique and highly effective lure movement.

In the fishing device 1 depicted herein, the winged arm retention member or eyelet 7 serves not only to retain arms 11A & 11B in their desired position but also as the site for securing the fishing line to the fishing device 1. Its stabilizing positioning provides a highly balanced multi-lured device while also effectively connecting the fishing line to the fishing device 1.

As recognized by the art, there exists a host of lure making sources which may be effectively adapted to the fabrication of the basic and essential embodiments of the fishing device 1 herein. Examples of lure making resources include www-.make-your-own-fishing-lures.com and *The Canadian Guide to Lure Making Updated Edition for Anglers and Lure Makers* and many other available publications which disclose the art of lure making. The finishing device 1 with or without lures L1, L2 & L3 also lends itself to mass manufacture.

Example 1

For illustrative purposes, a multiple spinner type lure 1L adapted for heavy tackle use as depicted by FIGS. 2-4 was made utilizing a winged section 5 constructed of 0.029 inch diameter titanium alloyed wire stock and a support shaft 3 being constructed of a 0.031 inch diameter stainless steel wire stock. The stainless steel wire stock for the wire support shaft 3 was sufficient to provide a wire support shaft measuring 2½ inches in total length terminated by a ⅛ inch I.D. (internal diameter) single loop 3E at the aft wire shaft end and a closed ⅛ inch I.D. looped wire retaining eyelet 7 at the forward shaft end. The winged section 5, support shaft 3 including the eyelet loops (3E & 7) and bends were fabricated with conventional loop forming and bending techniques utilizing the appropriate jig making equipment.

A commercially available ⅜ ounce leaded buzz bait jig body B equipped with a ⅛ inch vertical riveting bore and a horizontal slotted bore sized to accommodate the 3/16 inch O.D. of the aft loop end of wire support shaft 3 and a 4/0 hook eyelet size provided the initial structural components for the making jig lure L1 herein as depicted in FIGS. 2-4. The eyelets (not shown) of the hook H and the aft eyelet 3E of support shaft 3 were centered onto the buzz bait rivet receiving bore of body B and riveted together.

The winged section 5 was fabricated from a single strand of 0.029 inch diameter titanium wire stock measuring 6 inches in length. The making of the wire yoked guide 7 commenced by bi-folding the winged section wire stock at the wire stock center point about a 1/16 inch circular wire forming mandrel to provide a u-shaped guide trough 9u measuring 1/16 inch in inner diameter (i.e. I.D.). The resultant two bent halves of the wire stock immediately following the u-shaped guide trough 9u were thus positioned at a distance of ⅛ inch apart. A first 120 degree angular bend 9a at a distance of ⅛ inch removed from the outermost edge of u-shaped trough 9u was then made to both of the bent wire halves to provide the first bent wire section 9B comprised of the two wires for forming the yoked guide 9. Then, at a distance 3/16 inch removed from the 120 degree bend 9a, a second 90 angular degree bend 9b of the two wires was then made to form the second wire section 9A for the yoked guide 9 which then positions arms 11A & 11B at right angles at its juncture onto wire section 9A. Arms 11A & 11B were then crimped together immediately following the second bend 9b to provide a 1/16 inch lateral spacing between arms 11A &11B. At the junctures of arms 11A & 11B to the second yoked bent section 9b (i.e. at the right angle bend), each arm (i.e. 11A & 11B) was then radially bent outwardly by 40 angular degrees to provide an unrestrained angular radially displacement between arms 11A & 11B of 80 degrees which exceeds the 60 degree angular displacement Ro permitted by arm retaining eyelet 7. At this radial displacement, radial arms 11A & 11B become seated against support shaft wire eyelet 7 to provide a radial angular radius therebetween of 60 degrees which in turn places the lure eyelet mounts 13M1 & 13M2 at a terminal distance of 2⅜ inches apart.

The aforementioned shaping (i.e. lengths and angular bends) of the winged section wire stock provides a winged section wire yoked guide 9 which matingly and slideably engages onto the support shaft 3 while also allowing both arms to seat onto inner surface of arm retaining eyelet 7 and radially expand to the fishing position as illustrated by FIGS. 1-2 and 5-8. By the shaping of the yoked guide 9, the bi-folded portions of the titanium wire stock are laterally spaced apart at about 1/16 of an inch which in the completed wing section 3 provides sufficient spacing to allow arms 11A & 11B to clear the support shaft 3 while the yoked guide 9 slideably engages thereupon. It will also be observed (as illustrated by the Figures) that the configuration of the yoked guide 9 (as slideably engaged onto support shaft 3) will center arms 11A & 11B within the arm retaining eyelet 7 in a vertical downwardly position when the fishing device 1 is placed in the open fishing position as illustrated by FIGS. 1-2 and 5-8. As depicted by FIGS. 3 and 4 when the yoked guide 9 is withdrawn along the support shaft 3 from the arm retaining eyelet 7, arms 11A & 11B will neatly collapse about the support wire shaft 3 so as to permit convenient stowing of the lure L1.

Prior to fabricating the lure eyelet mounts 13M1 & 13M2, the winged section 5 then is ready for installation onto the main support wire shaft 3. This may be effectively accomplished by squeezing the outwardly extending arms 11A & 11B together so as to permit emplacement of arms 11A & 11B within the winged wire retaining eyelet 7 while slideably engaging the yoked guide 9 onto the underside of main wire support shaft 3 as more clearly depicted in FIGS. 3 and 6-8. After inserting arms 11A & 11B within winged arm retaining eyelet 7, the spinner blade eyelet mounts 13M1 & 13M2 may then be incorporated onto the terminal ends of arms 11A & 11B.

The fishing device 1 as depicted by FIGS. 1 and 3-5 may then be made ready for installing any desired lure fastener member (generally prefixed by 13F) to lure eyelet mounts 13M1 & 13M2 or by directly attaching the desired lures L2 & L3 to lure eyelet mounts 13M1 & 13M2. The lure eyelet mounts 13M1 & 13M2 are particularly well suited for mounting the ball bearing equipped snap swivel fasteners 13F or any such other suitable lure fasteners for the interchanging of lures such as roller swivel equipped with bull rings 13F to mounts 13M1 & 13M2.

Appropriate lead cements or molten lead may be applied to smooth out or fill in the void spaces of the jig body. The customary finished coatings or paint may then be applied to the jig body B. Suitable skirting F to enhance lure attractiveness of the collapsible multi-positional lure 1L herein may be accomplished by banding, winding, gluing and otherwise attaching the skirting F to the body B of the jig J. Typically, the riveted section of the jig is adapted to receive the elastic band E used to attached the skirting F to the jig body B. The elastic band E effectively covers the rivet (not shown) while also aesthetically improving the appearance of jig J and streamlines its aqueous performance.

In making the multiple positioned lure 1L of this example as depicted by FIGS. 2-4 using the fishing device 1 depicted by FIG. 1, the jig or buzz bait may be weighted typically from a 1/8 ounce weight and increased in 1/16 ounce increments up to 1/2 ounce weight or more for swift currents or deep water fishing. Exemplary hook sizes for the fishing lure L1 of this Example 1 may appropriately range from 1/0, 2/0, 3/0 and 4/0 hook size. The fishing device 1 of this Example may be particularly effectively used in combination with number 4 or larger sized spinner blades. Because dual spinner blades are capable of creating a high degree of torque and stress upon the winged section 5, greater winged section 5 strength has been achieved by fabricating the winged section 5 from the aforementioned titanium alloy wire stock. Stainless steel wire may also be used and especially under circumstances with other types of lures which do not place the same degree of stress upon the winged section 5. The shaft may be made of stainless steel wire at a cheaper cost which also provides durable shaft wear as well as resistance to rust as opposed to the corrosion often incurred with conventional rigid steel wire stock materials. If desired, high diameter wires of 0.050 or higher may be used for especially harsh fishing conditions.

Although the multiple lured fishing device 1L of this Example relies upon prefabricated jig assemblies, the fishing device 1 of FIG. 1 may be fabricated separately for use in conventional jig forming equipment relying upon pins to anchor the wire support shaft 3 to hook eyelet which may be then encased and molded within the jig mold with molten lead. After cooling, the support shaft 3 encased with the jig body B and firmly anchored therewithin onto the lure hook H may then be assembled onto the winged section 5 equipped with the appropriate lure mounts 13M1 & 13M2 for attachment thereto of the desired lures L2 & L3. Accordingly, it will be observed that the fishing device 1 herein lends itself to a host of multi-lured fishing devices 1L manufactured by a variety of different techniques. Although the fishing device 1 and the fishing device 1 with multiple lures 1L has been depicted as being made by conventional manual lure making techniques, automated and highly sophisticated robotic manufacturing techniques may be equally applied to its manufacture.

Example 2

This Example illustrates the making of a multiple spinner type lure 1L as depicted by FIG. 5 adapted for somewhat lighter tackle use. The fishing device 1 was made with the winged section 5 likewise being constructed of 0.029 inch diameter titanium alloyed wire and a support shaft 3 being constructed of a 0.031 inch diameter stainless steel wire. The support shaft 3 wire stock was sufficient to provide a support shaft 3 measuring 1 3/4 inches in total length terminated by a 1/8 inch I.D. single loop at the aft shaft end and a 1/8 inch I.D. closed looped wire retaining eyelet 7 at the forward shaft end. The winged section 5, support shaft 3 including the necessary eyelet loops and bends were likewise fabricated by conventional loop forming and bending techniques utilizing the appropriate jig making equipment.

A commercially available 1/8 ounce leaded buzz bait jig body equipped with a 1/8 inch vertical riveting bore and a horizontal slotted bore sized to accommodate the 3/16 inch O.D. of the aft loop end of wire support shaft 3 and a 2/0 hook eyelet size provided the initial structural components for the making of the jig lure L1 of this Example. The eyelets of the hook H and the aft eyelet 3E of support shaft 3 were centered onto the buzz bait rivet receiving bore of body B and riveted together onto the buzz bait body B.

The winged section 5 was fabricated from single strand titanium alloy wire stock measuring 6 inches in length. The making of the wire yoked guide 7 commenced as in Example 1 by bending the winged section wire stock at the wire stock center point about a circular wire forming mandrel to provide a u-shaped guide trough 9u measuring 1/16 inch I.D. The resultant two bent halves of the wire stock immediately following the u-shaped guide trough 9u were correspondingly spaced at a distance 1/8 inch apart. A first bend 9a of 120 angular degrees at a distance of 1/8 inch removed from the outermost edge of u-shaped trough 9u was then made to both bent wire halves to provide the first bent wire section 9B of yoked guide 9. As in Example 1, at a distance 3/16 inch removed from the 120 degree bend 9a, a second right angle bend 9b of 90 degrees was then made to provide a second yoked wire section 9A which completes the fabrication of yoked guide 9 and constitutes its juncture onto arms 11A & 11B. Arms 11A & 11B were then crimped together immediately following the second bend 9b to provide a 1/16 inch lateral spacing between arms 11A &11B. At the juncture of arm 11A & 11B to the second bend 9b of the second yoked bent section 9A (i.e. at the right angle bend of arms 11A & 11B), each arm 11A & 11B was then radially bent outwardly by 40 angular degrees to provide an unrestrained angular radially displacement between arms 11A & 11B of 80 degrees. At this radial displacement, the radial arms 11A & 11B upon assembly become seated against support shaft wire retaining eyelet 7 to provide a radial angular measurement therebetween of 60 degrees Ro which places the lure eyelet mounts 13M1 & 13M2 as retained within the arm retaining eyelet 7 at a distance of 2 3/8 inches apart.

Similarly to the Example 1 lure, the aforementioned shaping (i.e. lengths and angular bends) of the winged section wire stock provided a winged section wire guide 9 which matingly and slideably engages onto the support shaft 3 while also allowing both arms 11A &11B to seat onto inner surface or rim of arm retaining eyelet 7 at dead center and radially expand arms 11A & 11B to the fishing position as illustrated by FIGS. 1-2 and 5-8. By the shaping of the yoked guide 9, the bi-folded portions of the titanium alloy wire stock are laterally spaced apart at about 1/16 of an inch which in the completed wing section 3 provides sufficient spacing to allow yoked arms 11A & 11B to clear the support shaft 3 while slideably engaging thereupon. It will also be observed (as illustrated by the Figures) that the configuration of the yoked guide 9 (as slideably engaged onto support shaft 3) will center arms 11A & 11B within the arm retaining eyelet 7 in a vertical downwardly position when the fishing device 1 is placed in the open fishing position as illustrated by FIGS. 1-2 and 5-8. When the yoked guide 9 is withdrawn along the support shaft 3 and the arm retaining eyelet 7, arms 11A & 11B will neatly collapse about the support wire shaft 3 so as to permit convenient stowing of the lure L1.

Before fabricating the lure mounts 13M1 & 13M2 (as depicted in FIG. 5), the winged section 5 is typically ready for installation onto the main support wire shaft 3 and the arm retaining eyelet 7. This may be effectively accomplished by squeezing the outwardly extending arms 11A & 11B together so as to permit emplacement of arms 11A & 11B with or without the first right angle mounting bends of the spinner blade mounts 13M1 & 13M2 within the winged wire retaining eyelet 7 while slideably engaging the yoked guide 9 onto the underside of the main wire support shaft 3 as may be visualized in FIG. 3.

After threading arms 11A & 11B (with or without the first right angle bend for lure mounts 131 & 13M2) through the arm retaining eyelet 7 while seating the u-shaped guide trough 9u onto the underside of support wire shaft 3, the first right angle mount bent sections are ready for installation of the propeller spinner blades L2 & L3 and appropriate spinner blade bearings 13B1 & 13B2 after which the terminal right angled locking bend section 13T of lure mounts 13M1 & 13M2 may be made to provide the fixed mount of lures L2 & L3 on lure shaft 13M1 & 13M2.

The resultant multiple lured fishing device 1L may then be processed to the finished product similar to that used to provide the completed lure product in Example 1.

Similarly to Example 1, the Example 2 lure herein is adapted jig lead body weights of ⅛, ¼, ⅜, or ½ ounces weights and hook sizes of 1/0, 2/0, 3/0 and 4/0. Illustrative spinner blades include:

| Blade Size | Lure Weight | Turn |
| --- | --- | --- |
| #1 | ⅛-¼ oz. | CW |
| #1 | ⅛-¼ oz. | CCW |
| #2 | ⅜-½ oz. | CW |
| #2 | ⅜-½ oz. | CCW |

As evident from the aforementioned, the fishing device 1 herein provides a host of derivations which rely upon the basic fundamentals of the fishing device 1 of this invention.

Suitable skirting F to enhance lure attractiveness of the collapsible multi-positional lure L1 herein may be accomplished by banding, winding, gluing and otherwise attaching the skirting F to the riveted neck of the jig J.

In making the multiple positioned lure L1 of this example as depicted by FIGS. 2-5 using the fishing device 1 depicted by FIG. 1, the jig or buzz bait weighted lead sizes ranging from ⅛ ounce in 1/16 ounce increments to a ½ ounce in weight or more may be used. Exemplary hook sizes for this Example 2 fishing lure L1 may range from 1/0, 2/0, 3/0 and 4/0 hook size. The Example 2 fishing device 1 may be effectively combined with number 4 spinner blades or larger sized spinner blades. Because dual spinner or propeller blades are capable of creating a high degree of torque and stress upon the winged section 5, a winged section 5 of greater strength may be achieved by fabricating it from titanium wire stock. Stainless steel wire may also be used and especially with other types of lures which do not place the same degree of stress upon the winged section 5 as placed thereupon by the depicted spinner blade types of lures. The shaft however, may be a stainless steel wire which, at a cheaper cost than the titanium alloy wire stocks, provides a more durable wear and resistance to rust and corrosion than conventional rigid steel wire stock materials.

What is claimed is:

1. A stowable fishing device adapted to carry a plurality of fishing lures, said device comprising a support wire adapted to carry a fishing lure at one end of the support wire and a wire retaining eyelet immovably affixed at an opposite end of the support wire, and a winged wire section having a yoked wire support guide slideably engaging onto the support wire, with said winged section having a pair of radial arms extending outwardly from the yoked wire support guide, with said arms being equipped to respectively accommodate a second lure and a third lure, with the arms being slideably retained within the wire retaining eyelet so as to permit the arms to extend to a radially outwardly extending position when the yoked wire support guide is slideably drawn onto the wire retaining eyelet and retract within the wire retaining eyelet by slideably drawing the yoked support guide away from the wire retaining eyelet so as to collapse the arms within the wire retaining eyelet and align the arms along the support wire and thereby provide a compact and stowable fishing device.

2. The fishing device according to claim 1 wherein the yoked guide slideably engages onto the support wire with the arms being positioned in a transverse relationship to the yoked guide.

3. The fishing device according to claim 1 wherein the yoked guide includes a first bent section equipped with a wire engaging yolk slideably seated on an underside of the support wire and an angular bend between the first bent section and a second bent section so as to position the arms above the support wire and direct alignment within the eyelet when the arms attached to the yoked guide are slideably drawn to the radially outwardly extending position within the eyelet.

4. The fishing device according to claim 3 wherein at the interconnecting juncture of the arms with the yoked guide the arms are bent downwardly at a transverse plane to the yoked guide to provide downwardly extending arms.

5. The fishing device according to claim 3 wherein the downwardly extending arms are bent radially outward to laterally separate the arms sufficiently to permit a separated tracking of lures carried by said arms.

6. The fishing device according to claim 3 wherein the arms are respectively bent at a downwardly extending right angle and the arms are bent sufficiently radially outwardly to cause the arms to rest against an inner surface of the eyelet when the yoked guide is drawn within the eyelet.

7. The fishing device according to claim 3 wherein the yoked guide is slideably withdrawn sufficiently from the wire retaining eyelet to collapse the arms along the support wire.

8. The fishing device according to claim 3 wherein the yoked guide is slideably positioned within the wire retaining eyelet so as to permit the arms to expand radially outwardly to an open fishing position.

9. The fishing device according to claim 3 wherein at the one end opposite from the wire retaining eyelet, the support wire is equipped with a weighted fishing lure having a fishing hook attached thereto.

10. The fishing device according to claim 9 wherein winged section is constructed of a single strand of titanium alloy wire and the arms are bent sufficiently radially outwardly to cause the arms to rest against opposite inner surfaces of the eyelet when the wire support guide is drawn onto the eyelet and the eyelet also serves as connection for connecting the device onto a fishing line.

11. The device according to claim 10 wherein the support wire is constructed of a single strand of stainless steel wire.

12. The fishing device according to claim 1 wherein the support wire is equipped at an end opposite from the wire retaining eyelet with a weighted jig bearing a fishing hook.

13. The fishing device according to claim 1 wherein the arms include lure mounts for connecting lures to the arms.

14. The fishing device according to claim 13 wherein spinner blades are mounted to each of the lure mounts.

15. A method of fishing with a stowable fishing device adapted to carry a plurality of fishing lures, said device comprising a support wire adapted to carry a fishing lure at one end of the support wire and a wire retaining eyelet immovably affixed at an opposite end of the support wire, and a winged wire section having a yoked wire support guide slideably engaging onto the support wire, with said winged section having a pair of radial arms extending outwardly from the yoked wire support guide, with said arms being equipped to respectively accommodate a second lure and a third lure, with the arms being slideably retained within the wire retaining eyelet so as to permit the arms to extend to a radially outwardly extending position when the yoked wire support guide is slideably drawn onto the wire retaining eyelet and to retract the arms within the wire retaining eyelet by slideably drawing the support guide away from the wire retaining eyelet so as to collapse the arms within the wire retaining eyelet and align the arms along the support wire and thereby provide a compact and stowable fishing device, said method comprising:

a) preselecting the fishing device equipped with a weighted hooked lure at the one end of the support wire and lure mounts for mounting a desired fishing lure to each of the arms;

b) attaching the desired fishing lure to each of the lure mounts when said arms having been extended to the radially outwardly extending position so as to thereby provide the fishing device equipped with the plurality of fishing lures;

c) connecting the fishing device quipped with the plurality of fishing lures to a fishing line; and     d) fishing with the fishing device equipped with the plurality of fishing lures.

16. The method according to claim 15 wherein upon completion of the fishing, the method includes an additional step of retracting the arms by slideably drawing the support guide away from the wire retaining eyelet so as to collapse the arms within the wire retaining eyelet and align the arms along the support wire to thereby provide the compact and stowable fishing device.

17. A method for using a stowable fishing device adapted to carry a plurality of fishing lures, said device comprising a support wire adapted to carry a weighted fishing lure at one end of the support wire and a wire retaining eyelet immovably affixed at an opposite end of the support wire, and a winged wire section having a yoked wire support guide slideably engaging onto the support wire, with said winged section having a pair of radial arms extending outwardly from the yoked wire support guide at a laterally disposed position, with said arms being equipped to respectively accommodate a second lure and a third lure, with the arms being slideably retained within the wire retaining eyelet so as to permit the arms to extend to a radially outwardly extending position when the yoked wire support guide is slideably drawn onto the wire retaining eyelet and to retract within the wire retaining member by slideably drawing the yoked support guide away from the wire retaining eyelet so as to collapse the arms within the wire retaining eyelet and align the arms along the support wire so as to thereby provide the compact and stowable fishing device said method comprising retracting the arms to a stowable position by slideably drawing the yoked support guide away from the wire retaining eyelet so as to collapse the arms within the wire retaining eyelet and align the arms along the support wire so as to thereby provide the compact and stowable fishing device.

18. The method according to claim 17 wherein the yoked guide is slideably drawn onto the eyelet sufficiently to permit the arms to extend at the radially outwardly extending position therefrom.

19. The method according to claim 17 wherein the yoked wire support guide consist essentially of a yoked guide having a first bent section equipped with a wire engaging yoke slideably seated on an underside of the support wire and an angular bend between the first bent section and second bent section so as to position the arms above the support wire and direct alignment within the eyelet when the yoked guide is slideably drawn onto the eyelet.

\* \* \* \* \*